Figure 1:
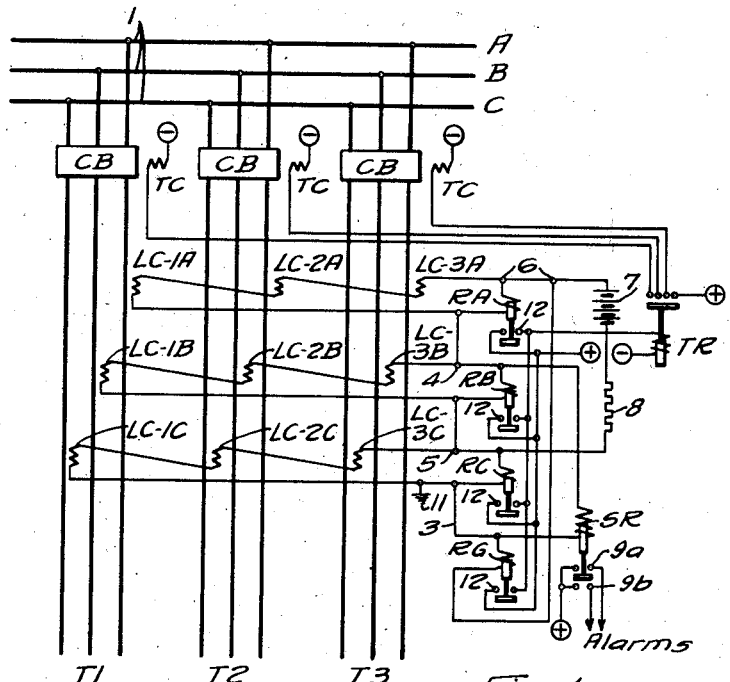

Dec. 11, 1945.  W. K. SONNEMANN  2,390,813
RELAY
Filed Oct. 24, 1942

WITNESSES:

INVENTOR
William K. Sonnemann.
BY
ATTORNEY

Patented Dec. 11, 1945

2,390,813

UNITED STATES PATENT OFFICE 2,390,813

RELAY

William K. Sonnemann, Roselle Park, N. J., assignor to Westinghouse Electric Corporation, East Pittsburgh, Pa., a corporation of Pennsylvania Application October 24, 1942, Serial No. 463,197

18 Claims. (Cl. 177—311)

My invention relates to protective relay systems, and it has particular relation to a series connection of a plurality of relays of different phases, in a closed circuit which can be readily supervised by the well-known Wheatstone-bridge method. While my invention is of general applicability to other types of relays, there is a particular need for it in some applications of linear couplers, or current-responsive devices which derive a voltage which is substantially linearly responsive to the line-current.

When these linear couplers are used in a current-differential system, for protecting a bus or other electrical device against internal faults, the voltages in the secondary circuits are normally balanced so that there is normally not any secondary current which can be used to indicate that the installation is healthy or operative. Nevertheless, it is desirable, and insisted upon by some operators, to have some kind of supervisory means which will afford an indication of short-circuits or open-circuits in the secondary winding. The conventional connections of a current-balance protective system, with protection against phase-faults and ground-faults, utilize four parallel-connected circuits, three circuits for the phase-fault relays and their corresponding secondary circuits of the couplers, and the fourth circuit for the residual-current relay or zero-phase-sequence relay which responds to ground-faults. This sort of circuit does not readily lend itself to supervision, being complicated, and requiring breaking into the phase-circuits with capacitors to block the supervisory direct current, while permitting the flow of the alternating-currents of the secondary circuits of the couplers.

The principal object of my invention is to provide a rearrangement of the secondary circuits whereby the various branches are connected in series with each other, thus forming a closed circuit which constitutes, to all intents and purposes, a Wheatstone bridge, which can be supervised by causing a supervisory direct current to be fed into the bridge across one diagonal thereof, and measuring the direct-current-flow across the other diagonal. Calculations and tests have shown that this method gives just as sensitive ground-fault protection as the conventional method, so that my novel method of secondary-circuit connection may well be utilized, even when there is no supervision. While my novel circuit-arrangement was originally prompted by a voltage-balance system which was difficult to supervise, it is not limited to a voltage-balance system, but may be utilized in other systems, for example, in systems utilizing conventional current-transformers which produce secondary currents matching the line-currents.

Figures 2, 3:
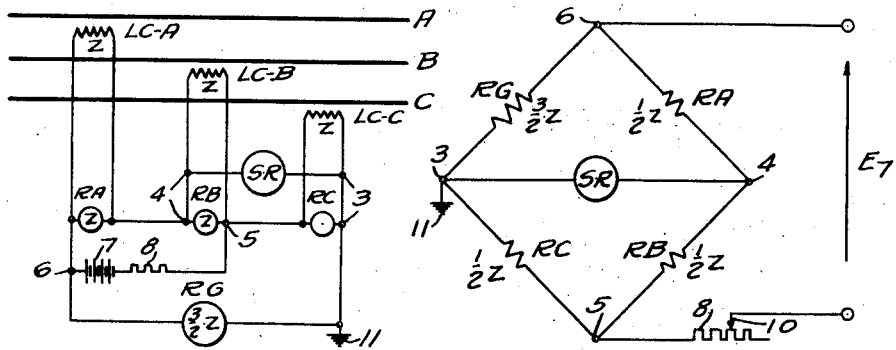

With the foregoing and other objects in view, my invention consists in the circuits, systems, apparatus, relays, parts, and methods, hereinafter described and claimed, and illustrated in the accompanying drawing, wherein:

Figure 1 is a diagrammatic view of a differential-current bus-protecting system utilizing linear couplers with a series-connected or closed-circuit secondary connection which is supervised by the Wheatstone-bridge method, in accordance with my invention, Fig. 2 is a schematic view of the equivalent alternating-current connections, together with the supervisory circuits, also indicating the applicability of my invention to an electro-responsive polyphase relay-system in which the currents are not normally balanced, and Fig. 3 is a diagrammatic view showing the equivalent circuit for the secondary connections, illustrating the Wheatstone-bridge principle.

In Fig. 1, I have illustrated my invention as applied to the protection of a three-phase bus 1, having the three phase-conductors A, B, and C. The bus is a multi-terminal bus, having more than two polyphase terminals or feeders T1, T2, and T3, each terminal being connected to the bus through a circuit breaker CB which is controlled by a trip-coil TC.

In Fig. 1, I have illustrated a protective system utilizing linear couplers LC, one for each phase and terminal, with subscripts to identify the terminal, as 1, 2, or 3, and the phase, as A, B, or C. While my invention is applicable to ordinary current-transformers which are associated with the various phases and terminals, and is also generally applicable to any other deriving-means which are responsive to any polyphase electrical quantity of the protected bus or other protected device, I have illustrated the use of linear couplers, such as are described and claimed in Harder Patent No. 2,241,127, May 6, 1941, assigned to the Westinghouse Electric & Manufacturing Company. These couplers have the property of deriving or developing a secondary voltage which is substantially linearly responsive to the line-current in its associated phase-conductor, for substantially all values of the line-current.

In a balanced-current differential protective system, such as that shown in Fig. 1, the secondary circuits of the couplers are so connected as to respond to the vectorial sum of the incoming and outgoing currents in each of the respective phases of the protected device. Where linear couplers are utilized, as illustrated, it is more usual to obtain this summation-effect by connecting the phase-A secondaries of all of the bus-terminals in series with each other, and in series with the operating coil of the phase-A relay RA, and similarly for the other two phases, although shunt-connections of the coupler-secondaries may be utilized. In cases where residual-current protection is required, it has been the practice heretofore to connect the three phase-circuits in parallel with each other, and the residual-current or ground-fault relay RG in parallel with all three.

In accordance with my present invention, however, the three phase-fault relays RA, RB, and RC are first connected in shunt across the terminals of the respective phase-A, phase-B, and phase-C secondaries of the linear couplers, to provide three phase-circuits, one for each of the line-phases A, B, and C. Then the three phase-circuits are connected in series with each other, and in series with the ground-fault relay RG, thus constituting a four-legged bridge.

Where supervision of the secondary circuits is required, I provide a supervisory relay SR which is connected across one diagonal 3—4 of the bridge, and I provide a source of supervisory current which is connected across the other bridge-diagonal 5—6, the supervisory source being indicated as comprising a battery 7 and a resistance 8. The supervisory relay SR is a sensitive direct-current relay, which may have a high reactance, or other construction, whereby it responds selectively to the supervisory direct-currents, rather than to the secondary currents of the couplers, which are alternating currents.

The secondary circuits of Fig. 1 may be traced more in detail, as follows. Starting at the bridge-terminal 6 at the top right-hand corner of the secondary circuit, and moving around toward the left, the circuit can be traced through the three phase-A coupler-secondaries LC—3A, LC—2A, and LC—1A, and thence to the next bridge-terminal 4. The two terminals 6 and 4 thus constitute the phase-A output-terminals of the couplers, in which there is produced a voltage proportionate to the vectorial sum of the three phase-A currents in the three terminals T1, T2, and T3. The operating coil of the phase-A relay is connected directly across these phase-A output-terminals 6 and 4. Continuing around, in the bridge-circuit of Fig. 1, from the bridge-terminal 4, it is noted that the circuit continues through the three phase-B coupler-secondaries LC—3B, LC—2B, and LC—1B, to the bridge-terminal 5, with the operating coil of the phase-B relay RB connected across the terminals 4 and 5. Then the bridge-circuit continues, from the terminal 5, through the three coupler-secondaries LC—3C, LC—2C, and LC—1C, to the bridge-terminal 3, with the operating coil of the phase-C relay RC connected across the terminals 5 and 3. The bridge-circuit is finally completed, from the terminal 3 to the terminal 6, through the operating coil of the ground-relay RG, all as shown in Fig. 1.

In Fig. 2, the same circuit is shown, in a somewhat more simplified fashion, in which the three coupler-secondaries of each phase have been condensed or combined into one coupler-member, marked LC—A for phase-A, and LC—B and LC—C for the other two phases. The secondary-impedances of these three coupler-secondaries have been marked with Z, where Z is equal to three times the impedance of any one of the coupler-secondaries, such as the coupler-secondary LC—1A, in Fig. 1, or, in general, if the bus has $n$ terminals, instead of just the three terminals which are illustrated in Fig. 1, the secondary impedance Z in Fig. 2 may be regarded as being equal to $n$ times the impedance of one of the coupler-secondaries in Fig. 1. For maximum energy-input into the various phase-fault-responsive relays RA, RB, and RC, the impedance of each relay-coil should match that of the coupler-secondaries, and it has, accordingly, been marked with a Z, in Fig. 2, although I am not limited to this precise adjustment. For maximum energy-input into the ground-relay RG, the impedance of its operating coil should be equal to the sum of the impedances of the three phase-circuits, each phase-circuit consisting of the relay-coil impedance Z, shunted by the coupler-secondary impedance Z. I have, accordingly, marked the RG-coil as having an impedance of $$\frac{3}{2}Z$$

although I am not limited to this particular impedance.

Fig. 2 may also be regarded as illustrative of other features or aspects or applications of my invention. Thus, the couplers LC—A, LC—B, and LC—C, may be regarded, not as the composite equivalents of summating couplers in the $n$ different terminals, but as being simply couplers associated with the respective phase-conductors A, B, and C of a three-phase line of any kind. Likewise, the couplers may be regarded as symbolic of any coupling devices, such as ordinary current-transformers, not necessarily either linearly responsive or voltage-producing transforming-devices. Where current-transformers are utilized, the current-transformer secondaries would have a very high impedance for any currents but its own currents, so that, in considering the impedance of the entire secondary circuit, including all three phases and the ground-relay RG, the current-transformer secondaries would be considered as having a substantially infinite impedance for the circulating currents, so that, for maximum energy-input, the impedance of the ground-relay coil RG would be 3Z, or three times the impedance of each of the phase-relays RA, RB, and RC.

Fig. 3 shows more clearly the performance of the supervisory circuits, as the alternating-current supply-circuit connections have been omitted, and the secondary circuit has been drawn in the form of a Wheatstone bridge, utilizing the same numerals and letters as before, and indicating the equivalent impedance of each of the four branches or legs of the bridge. The equivalent battery-voltage has been indicated at $E_7$ in Fig. 3.

While I am not limited to the particular magnitudes of impedances which are indicated in Fig. 3, it will be noted that, with the indicated values of impedances, the bridge will be not quite balanced, so that normally there will be a slight current-flow in the supervisory relay SR. In many cases, this is an advantage, as it makes it possible for the supervisory relay to detect either an open-circuit condition or a short-circuit condition, by providing the relay with both a make-contact and a break-contact, as shown at 9a and 9b in Fig. 1, so as to indicate either an abnormal increase, or an abnormal decrease, in the supervisory current, in either event, energizing an alarm, as indicated schematically in Fig. 1. The balance-point of the supervisory relay SR may be adjusted, for example, by means of tap 10 on the resistor 8 which is in series with the supervisory source, as indicated in Fig. 3, so that normally the supervisory relay SR occupies a position in which both its front-contact 9a (Fig. 1) and its back-contact 9b are open. As previously indicated, however, I am not limited to the particular bridge-impedances which have been shown in Fig. 3, so that a normally balanced bridge, for example, could be utilized.

By grounding the direct-current source 7 or E₇ at one terminal, for example, at the terminal 3, as indicated at 11 in all three figures, ground-faults in the secondary relaying circuits may also be detected by the supervisory relay SR.

It will be understood that the supervisory relay SR may be adjusted to respond to much smaller currents than those necessary to operate the fault-responsive relays RA, RB, RC, and RG, so that the supervisory equipment does not affect the operation of the fault-responsive relays.

As shown in Fig. 1, the four fault-responsive relays are each provided with a make-contact 12, and the four make-contacts 12 are connected in parallel with each other, to energize a trip-relay TR which, in turn, energizes the trip coils TC of each of the terminal circuit-breakers CB.

From the foregoing description, it will be observed that only one supervisory relay SR is required for the three phase-relays and the ground-relay, or, if either the phase-relays or the ground-relays are omitted, dummy-impedances may be utilized in their stead, to make up the four-legged bridge, which can be readily supervised by the Wheatstone-bridge method. A supervisory relay is provided, which will detect both open-circuits and short-circuits, as well as grounds, in the secondary relay circuits. Supervision of the secondary circuits is provided without affecting the alternating-current operation or response, and without introducing additional equipment, such as blocking-capacitors, which would constitute an additional hazard of failure. And, finally, the foregoing advantages are obtained in an electrical secondary-circuit which makes it possible for the ground-relays to obtain the same amount of energy-input as in the conventional relaying-system previously used, in which shunt-connected circuits, rather than series-connected circuits, were utilized for the different phases and the ground-relay.

In case of any kind of fault on the bus 1, the sum of the currents entering the bus through the terminals T1, T2 and T3 will not be zero, because of the fault-current flowing out of the bus and into the fault. This applies to any kind of fault, on any of the phases of the bus 1.

Thus, if the fault is on phase A, for example, the sum of the phase-A currents in terminals T1, T2 and T3 will not be zero, and hence the sum of the voltages in the coupler-secondaries LC—1A, LC—2A and LC—3A will not be zero, so that the alternating-current relay RA picks up and energizes the tripping relay TR, which separates the bus 1 from all sources of power-supply.

If the bus-fault is a phase-to-phase fault involving two or more of the phase-conductors A, B and C, the fault will cause a similar response of two or more of the phase-relays RA, RB and RC, any one of which would energize the tripping relay TR.

If the bus-fault involves ground-current, the fault-current will have a zero-phase-sequence component, that is to say, an alternating-current component which flows in the same direction in each of the three relay-coils RA, RB and RC. These three coils are connected in series, in a circuit which can be traced from the point 6 successively through the RA-coil, the point 4, the RB-coil, the point 5, the RC-coil, the point 3, and the RG-coil, back to the point 6. It will be noted that the energizing coil of the ground-fault relay RG is thus energized. This ground-fault relay is usually made more sensitive than the phase-fault relays, because it responds to zero-sequence current-components which are not commonly present on the line at all. When the ground-fault relay RG responds, it energizes the tripping relay TR, which isolates the faulty bus 1.

In case a fault should occur on any one of the feeder-lines T1, T2 or T3 which are connected to the bus 1, the sum of the currents entering the bus will be zero in each of the phases, which means that there will be no response of any of the relays RA, RB, RC or RG, and hence all of the trip-coils TC will not be energized. Such a fault will have to be cleared by other means, which have not been shown, as my invention relates only to the means which are devised for taking care of faults on the bus 1.

The supervisory relay SR is for the purpose of constantly watching over the circuits including the relay-coils RA, RB, RC and RG, and including also the supply-circuits which are respectively connected in parallel to the several coils RA, RB and RC. For example, the coil RA is paralleled by the supply-circuit including the serially connected coupler-secondaries LC—1A, LC—2A and LC—3A, the impedance of which is lumped together at LC—A in Fig. 2. If the impedance of the coil RA is Z, and if the impedance of the parallel-connected supply-circuit LC—A is Z, as previously described, then the equivalent bridge-circuit impedance of Fig. 3 is Z/2, for that leg of the bridge. Direct current is constantly circulated through one diagonal of the bridge, with a current-magnitude which is well below the pick-up threshold of response of any of the relays RA, RB, RC or RG. If anything happens to this bridge, in the way of any kind of open circuit or short circuit or ground, the magnitude of one or more of the bridge-impedances will be changed, thus changing the value of the direct current flowing through the coil of the supervisory relay SR, which is connected in the second diagonal of the bridge. Thus, the supervisory relay SR responds by either picking up or dropping out, so as to give an alarm when anything happens to the impedances of the bridge.

While I have described my invention and illustrated it more particularly with respect to a single form of embodiment and application, I desire it to be understood that my invention is not limited to this precise form of embodiment or application, or to the precise choice of constants which have been suggested. I desire, therefore, that the appended claims shall be accorded the broadest construction consistent with their language.

I claim as my invention:

1. The combination with a protected polyphase electrical device, of polyphase deriving-means, responsive to a polyphase electrical quantity of the protected device, for providing a plurality of pairs of output-terminals similarly responsive to different phases of said polyphase electrical quantity, a separate electro-responsive protective-relay apparatus operatively associated with each of said pairs of output-terminals for similarly responding to faults in its phase, and a four-legged bridge-circuit including said polyphase output-terminals and said electro-responsive apparatus, said bridge-circuit comprising four serially connected legs in a closed circuit.

2. The combination with a protected polyphase electrical device, of polyphase deriving-means, responsive to a polyphase electrical quantity of the protected device, for providing polyphase output-terminals the several phases of which are similarly responsive to the corresponding phases of said polyphase electrical quantity, a plurality of phase-responsive electro-responsive devices, one for each phase, a zero-phase-sequence electro-responsive device, circuit-connections for connecting all of the phases of the output-terminals of said deriving-means in series with each other and in series with said zero-phase-sequence electro-responsive device, and circuit-connections for connecting each phase-responsive electro-responsive device in shunt-circuit relation across the output-terminals of its corresponding phase of the deriving means.

3. The combination, with a protected polyphase electrical device, of polyphase deriving-means, responsive to a polyphase electrical quantity of the protected device, for providing polyphase output-terminals having voltages the several phases of which are similarly responsive to the corresponding phases of said polyphase electrical quantity, a plurality of phase-responsive electro-responsive devices, one for each phase, a zero-phase-sequence electro-responsive device, circuit-connections for connecting all of the phases of the output-terminals of said deriving-means in series with each other and in series with said zero-phase-sequence electro-responsive device, and circuit-connections for connecting each phase-responsive electro-responsive device in shunt-circuit relation across the output-terminals of its corresponding phase of the deriving-means.

4. The combination with a protected polyphase electrical device, of polyphase deriving-means, responsive to the polyphase current of the protected device, for providing polyphase output-terminals the several phases of which are similarly responsive to the corresponding phases of said polyphase current, a plurality of phase-responsive electro-responsive devices, one for each phase, a zero-phase-sequence electro-responsive device, circuit-connections for connecting all of the phases of the output-terminals of said deriving-means in series with each other and in series with said zero-phase-sequence electro-responsive device, and circuit-connections for connecting each phase-responsive electro-responsive device in shunt-circuit relation across the output-terminals of its corresponding phase of the deriving-means.

5. The combination, with a protected polyphase electrical device, of substantially linearly responsive couplers, responsive to the polyphase current of the protected device, for providing polyphase output-terminals having voltages the several phases of which are similarly responsive to the corresponding phases of said polyphase current of the protected device, a plurality of phase-responsive electro-responsive devices, one for each phase, a zero-phase-sequence electro-responsive device, circuit-connections for connecting all of the phases of the output-terminals of said couplers in series with each other and in series with said zero-phase-sequence electro-responsive device, and circuit-connections for connecting each phase-responsive electro-responsive device in shunt-circuit relation across the output-terminals of its corresponding phase of the couplers.

6. Current-differential protective-means for a polyphase electrical device, comprising a plurality of deriving-means, one for each phase, for responding to the vectorial sum of the in-coming and out-going currents in each of the respective phases of the protected device, electro-responsive apparatus, and a four-legged bridge-circuit including said plurality of deriving-means and said electro-responsive apparatus, said bridge-circuit comprising four serially connected legs in a closed circuit.

7. Current-differential protective-means for a polyphase electrical device, comprising a plurality of deriving-means, one for each phase, for responding to the vectorial sum of the in-coming and out-going currents in each of the respective phases of the protected device, a zero-phase-sequence electro-responsive device, and circuit-connections for connecting all of the deriving-means in series with each other and in series with said zero-phase-sequence electro-responsive device so that said zero-phase-sequence electro-responsive device is responsive substantially to the zero-phase-sequence component of all of the vectorial sums of the in-coming and out-going currents in the respective phases of the protected device.

8. Current-differential protective-means for a polyphase electrical device, comprising a plurality of deriving-means, one for each phase, for responding to the vectorial sum of the in-coming and out-going currents in each of the respective phases of the protected device, a plurality of phase-responsive electro-responsive devices, one for each phase, a zero-phase-sequence electro-responsive device, circuit-connections for connecting all of the deriving-means in series with each other and in series with said zero-phase-sequence electro-responsive device so that said zero-phase-sequence electro-responsive device is responsive substantially to the zero-phase-sequence component of all of the vectorial sums of the in-coming and out-going currents in the respective phases of the protected device, and circuit-connections for connecting each phase-responsive electro-responsive device in shunt-circuit relation across its own deriving-means so as to be responsive substantially to the vectorial sum of the in-coming and out-going currents in its own phase of the protected device.

9. Current-differential protective-means for a polyphase electrical device, comprising a plurality of substantially linearly responsive couplers, one for each phase and each terminal of the protected device, each coupler having output-terminals having voltages responsive to the current in its corresponding phase and terminal of the protected device, a plurality of phase-responsive electro-responsive devices, one for each phase, a zero-phase-sequence electro-responsive device, circuit-connections for connecting all of the output-terminals of the couplers in series with each other and in series with said zero-phase-sequence electro-responsive device so that said zero-phase sequence electro-responsive device is responsive substantially to the zero-phase-sequence component of all of the vectorial sums of the in-coming and out-going currents in the respective phases of the protected device, the couplers of each of the respective phases being grouped together in the series connection, and circuit-connections for connecting each phase-responsive electro-responsive device in shunt-circuit relation across the couplers of its own phase so as to be responsive substantially to the vectorial sum of the in-coming and out-going currents in its own phase of they protected device.

10. The combination, with a protected three-phase electrical device, of three-phase deriving-means, responsive to a three-phase electrical quantity of the protected device, for providing a plurality of pairs of output-terminals similarly responsive to different phases of said three-phase electrical quantity, a separate electro-responsive protective-relay apparatus operatively associated with each of said pairs of output-terminals for similarly responding to faults in its phase, a four-legged bridge-circuit including said polyphase output-terminals and said electro-responsive apparatus, said bridge-circuit comprising four serially connected legs in a closed circuit, three of said legs corresponding to the three phases, means for connecting a source of supervisory current across one diagonal of the bridge, and means for detecting an abnormal condition of current-flow of the supervisory current across the other diagonal of the bridge.

11. The combination, with a protected three-phase electrical device, of three-phase deriving-means, responsive to a three-phase electrical quantity of the protected device, for providing three-phase output-terminals the several phases of which are similarly responsive to the corresponding phases of said three-phase electrical quantity, three phase-responsive electro-responsive devices, one for each phase, a zero-phase-sequence electro-responsive device, circuit-connections for connecting all of the phases of the output-terminals of said deriving-means in series with each other and in series with said zero-phase-sequence electro-responsive device, circuit-connections for connecting each phase-responsive electro-responsive device in shunt-circuit relation across the output-terminals of its corresponding phase of the deriving-means, the series connection comprising a four-legged bridge-connection made up of the three phases for three legs and the zero-phase-sequence electro-responsive device for the fourth leg, means for connecting a source of supervisory current across one diagonal of the bridge, and means for detecting an abnormal condition of current-flow of the supervisory current across the other diagonal of the bridge.

12. The combination, with a protected three-phase electrical device, of three-phase deriving-means, responsive to a three-phase electrical quantity of the protected device, for providing three-phase output-terminals having voltages the several phases of which are similarly responsive to the corresponding phases of said three-phase electrical quantity, three phase-responsive electro-responsive devices, one for each phase, a zero-phase-sequence electro-responsive device, circuit-connections for connecting all of the phases of the output-terminals of said deriving-means in series with each other and in series with said zero-phase-sequence electro-responsive device, circuit-connections for connecting each phase-responsive electro-responsive device in shunt-circuit relation across the output-terminals of its corresponding phase of the deriving-means, the series connection comprising a four-legged bridge-connection made up of the three phases for three legs and the zero-phase-sequence electro-responsive device for the fourth leg, means for connecting a source of supervisory current across one diagonal of the bridge, and means for detecting an abnormal condition of current-flow of the supervisory current across the other diagonal of the bridge.

13. The combination, with a protected three-phase electrical device, of three-phase deriving means, responsive to a three-phase current of the protected device, for providing three-phase output terminals the several phases of which are similarly responsive to the corresponding phases of said three-phase current, three phase-responsive electro-responsive devices, one for each phase, a zero-phase-sequence electro-responsive device, circuit-connections for connecting all of the phases of the output-terminals of said deriving-means in series with each other and in series with said zero-phase-sequence electro-responsive device, circuit-connections for connecting all of the phases of the output-terminals of said deriving-means in series with each other and in series with said zero-phase-sequence electro-responsive device, circuit-connections for connecting each phase-responsive electro-responsive device in shunt-circuit relation across the output terminals of its corresponding phase of the deriving means, the series connection comprising a four-legged bridge-connection made up of the three phases for three legs and the zero-phase-sequence electro-responsive device for the fourth leg, means for connecting a source of supervisory current across one diagonal of the bridge, and means for detecting an abnormal condition of current-flow of the supervisory current across the other diagonal of the bridge.

14. The combination, with a protected three-phase electrical device, of substantially linearly responsive couplers, responsive to the three-phase current of the protected device, for providing three-phase output-terminals having voltages the several phases of which are similarly responsive to the corresponding phases of said three-phase current of the protected device, three phase-responsive electro-responsive devices, one for each phase, a zero-phase-sequence electro-responsive device, circuit-connections for connecting all of the phases of the output-terminals of said couplers in series with each other and in series with said zero-phase-sequence electro-responsive device, circuit-connections for connecting each phase-responsive electro-responsive device in shunt-circuit relation across the output-terminals of its corresponding phase of the couplers, the series connection comprising a four-legged bridge-connection made up of the three phases for three legs and the zero-phase-sequence electro-responsive device for the fourth leg, means for connecting a source of supervisory current across one diagonal of the bridge, and means for detecting an abnormal condition of current-flow of the supervisory current across the other diagonal of the bridge.

15. Current-differential protective-means for a three-phase electrical device, comprising three deriving-means, one for each phase, for responding to the vectorial sum of the in-coming and out-going currents in each of the respective phases of the protected device, electro-responsive apparatus, and a four-legged bridge-circuit including said plurality of deriving-means and said electro-responsive apparatus, said bridge-circuit comprising four serially connected legs in a closed circuit, three of said legs corresponding to the three phases, means for connecting a source of supervisory current across one diagonal of the bridge, and means for detecting an abnormal condition of current-flow of the supervisory current across the other diagonal of the bridge.

16. Current-differential protective-means for a three-phase electrical device, comprising three deriving-means, one for each phase, for responding to the vectorial sum of the in-coming and out-going currents in each of the respective phases of the protected device, a zero-phase-sequence electro-responsive device, circuit-connections for connecting all of the deriving-means in series with each other and in series with said zero-phase-sequence electro-responsive device so that said zero-phase-sequence electro-responsive device is responsive substantially to the zero-phase-sequence component of all of the vectorial sums of the in-coming and out-going currents in the respective phases of the protected device, the series connection comprising a four-legged bridge-connection made up of the three phases for three legs and the zero-phase-sequence electro-responsive device for the fourth leg, means for connecting a source of supervisory current across one diagonal of the bridge, and means for detecting an abnormal condition of current-flow of the supervisory current across the other diagonal of the bridge.

17. Current-differential protective-means for a three-phase electrical device, comprising three deriving-means, one for each phase, for responding to the vectorial sum of the in-coming and out-going currents in each of the respective phases of the protected device, three phase-responsive electro-responsive devices, one for each phase, a zero-phase-sequence electro-responsive device, circuit-connections for connecting all of the deriving-means in series with each other and in series with said zero-phase-sequence electro-responsive device so that said zero-phase-sequence electro-responsive device is responsive substantially to the zero-phase-sequence component of all of the vectorial sums of the in-coming and out-going currents in the respective phases of the protected device, circuit-connections for connecting each phase responsive electro-responsive device in shunt-circuit relation across its own deriving-means so as to be responsive substantially to the vectorial sum of the in-coming and out-going currents in its own phase of the protected device, the series connection comprising a four-legged bridge-connection made up of the three phases for three legs and the zero-phase-sequence electro-responsive device for the fourth leg, means for connecting a source of supervisory current across one diagonal of the bridge, and means for detecting an abnormal condition of current-flow of the supervisory current across the other diagonal of the bridge.

18. Current-differential protective-means for a three-phase electrical device, comprising three substantially linearly responsive couplers, one for each phase and each terminal of the protected device, each coupler having output-terminals having voltages responsive to the current in its corresponding phase and terminal of the protected device, three phase-responsive electro-responsive devices, one for each phase, a zero-phase-sequence electro-responsive device, circuit-connections for connecting all of the output-terminals of the couplers in series with each other and in series with said zero-phase-sequence electro-responsive device so that said zero-phase-sequence electro-responsive device is responsive substantially to the zero-phase-sequence component of all of the vectorial sums of the in-coming and out-going currents in the respective phases of the protected device, the couplers of each of the respective phases being grouped together in the series connection, circuit-connections for connecting each phase-responsive electro-responsive device in shunt-circuit relation across the couplers of its own phase so as to be responsive substantially to the vectorial sum of the in-coming and out-going currents in its own phase of the protected device, the series connection comprising a four-legged bridge-connection made up of the three phases for three legs and the zero-phase-sequence electro-responsive device for the fourth leg, means for connecting a source of supervisory current across one diagonal of the bridge, and means for detecting an abnormal condition of current-flow of the supervisory current across the other diagonal of the bridge.

WILLIAM K. SONNEMANN.